(12) United States Patent
Liu et al.

(10) Patent No.: US 10,983,649 B2
(45) Date of Patent: Apr. 20, 2021

(54) TOUCH CONTROL MODULE, DISPLAY PANEL, DISPLAY DEVICE AND TOUCH CONTROL METHOD

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Bo Liu, Beijing (CN); Xianjie Shao, Beijing (CN); Xiujuan Wang, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 331 days.

(21) Appl. No.: 15/781,773

(22) PCT Filed: Jun. 29, 2017

(86) PCT No.: PCT/CN2017/090742
§ 371 (c)(1),
(2) Date: Jun. 6, 2018

(87) PCT Pub. No.: WO2018/145396
PCT Pub. Date: Aug. 16, 2018

(65) Prior Publication Data
US 2020/0272280 A1    Aug. 27, 2020

(30) Foreign Application Priority Data
Feb. 13, 2017    (CN) .......................... 201710076091.0

(51) Int. Cl.
*G06F 3/041*    (2006.01)
*G06F 3/044*    (2006.01)

(52) U.S. Cl.
CPC .......... *G06F 3/0447* (2019.05); *G06F 3/0412* (2013.01); *G06F 3/0418* (2013.01); *G06F 3/0446* (2019.05); *G06F 3/04166* (2019.05)

(58) Field of Classification Search
CPC .... G06F 3/0412; G06F 3/0414; G06F 3/0418; G06F 3/04166; G06F 3/0447
See application file for complete search history.

(56) References Cited

U.S. PATENT DOCUMENTS

2011/0210944 A1    9/2011  Chen et al.
2015/0177880 A1*   6/2015  Shin ..................... G09G 3/2096
                                              345/174

(Continued)

FOREIGN PATENT DOCUMENTS

CN    101887333 A    11/2010
CN    103631463 A     3/2014

(Continued)

OTHER PUBLICATIONS

First Office Action for Chinese Patent Application No. 201710076091.0 dated Jan. 23, 2019.

(Continued)

*Primary Examiner* — Xuemei Zheng
(74) *Attorney, Agent, or Firm* — Calfee, Halter & Griswold LLP

(57) ABSTRACT

A touch control module, a display panel, a display device, and a touch control method. The touch control module includes a first substrate and an array of touch electrodes disposed on a first surface of the first substrate. In a touch control period of a touch electrode row, the touch electrode row and at least one touch electrode row directly adjacent to (Continued)

the touch electrode row are configured to receive a same touch scan signal simultaneously. Therefore, under synchronous modulation, the influence of the coupling between directly adjacent touch electrode rows is reduced and overall uniformity of the capacitance is achieved, so that accuracy of the touch positioning and the pressure touch control can be improved.

12 Claims, 4 Drawing Sheets

(56) References Cited

U.S. PATENT DOCUMENTS

| | | | | |
|---|---|---|---|---|
| 2016/0062504 | A1* | 3/2016 | Hwang | G09G 3/3696 345/174 |
| 2018/0039367 | A1* | 2/2018 | Suzuki | G02F 1/1343 |

FOREIGN PATENT DOCUMENTS

| | | |
|---|---|---|
| CN | 105786287 A | 7/2016 |
| CN | 105912157 A | 8/2016 |
| CN | 106354339 A | 1/2017 |
| CN | 106708328 A | 5/2017 |
| KR | 20160094575 A | 8/2016 |

OTHER PUBLICATIONS

Search Report and Written Opinion for International Application No. PCT/CN2017/090742 dated Sep. 28, 2017.

* cited by examiner

TOUCH CONTROL MODULE, DISPLAY PANEL, DISPLAY DEVICE AND TOUCH CONTROL METHOD

RELATED APPLICATIONS

The present application is the U.S. national phase entry of the international application PCT/CN2017/090742, with an international filing date of Jun. 29, 2017, which claims the benefit of Chinese Patent Application No. 201710076091.0, filed on Feb. 13, 2017, the entire disclosures of which are incorporated herein by reference.

TECHNICAL FIELD

The present disclosure relates to the field of display technology, particularly to a touch control module, a display panel, a display device and a touch control method.

BACKGROUND

With the fast development of display technology, touch screen panels have gradually become popular in people's lives. Currently touch screen panels can be divided, on basis of their construction, into Add-On type touch screen panels, On-Cell type touch screen panels, and In-Cell type touch screen panels. In Add-On type touch screen panels, a touch screen panel and a liquid crystal display (LCD) panel are fabricated separately and then glued together to form a LCD panel with touch functionality. The Add-On type touch screen panel has drawbacks of high fabrication cost, low light transmittance, and a large module thickness. Touch electrodes of the In-Cell type touch screen panel are embedded inside the LCD panel, and reduce the overall module thickness and greatly decrease the fabricating cost, making it the favorite choice of the panel manufacturers.

SUMMARY

The embodiments of the present disclosure provide a touch control module, a display panel, a display device and a touch control method. Each reduce the influence of the coupling between directly adjacent touch electrode rows and achieve overall uniformity of the capacitance value, thereby improving the accuracy of touch positioning and pressure touch control.

An embodiment of the present disclosure provides a touch control module. The touch control module includes a first substrate and an array of touch electrodes disposed on a first surface of the first substrate. In a touch control period of a touch electrode row, the touch electrode row and at least one touch electrode row directly adjacent to the touch electrode row are configured to receive a same touch scan signal simultaneously.

In an embodiment of the present disclosure, in a touch control period of a touch electrode row, the same touch scan signal is simultaneously applied to the touch electrode row and at least one touch electrode row directly adjacent to the touch electrode row. In some embodiments of the present disclosure, an array of touch electrodes can include, for example, a plurality of touch electrode rows and a plurality of touch electrode columns perpendicular to the plurality of touch electrode rows. In the context of the present disclosure, the "row" and the "column" are interchangeable concepts. Therefore, in some embodiments, in a touch period of a touch electrode column, the same touch scanning signal is simultaneously applied to the touch electrode column and at least one touch electrode column directly adjacent to the touch electrode column. In certain exemplary embodiments, the touch control module further comprises a plurality of feedback signal switches corresponding one-to-one to the touch electrodes in the array of touch electrodes; and during a touch control period of a touch electrode row, a feedback signal of the at least one touch electrode row directly adjacent to the touch electrode row is not received.

In some embodiments, in order to accurately obtain the touch position and the touch area, the touch control module can further include a plurality of feedback signal switches corresponding one-to-one to the touch electrodes in the array of touch electrodes; and during a touch control period of a touch electrode row//column, a feedback signal of the at least one touch electrode row//column directly adjacent to the touch electrode row//column is not received. In certain exemplary embodiments, the touch control module is used in a self-capacitance touch mode.

In certain exemplary embodiments, the touch control module further includes a common electrode disposed at a predetermined distance from the array of touch electrodes; and at least one of the first substrate and the common electrode is deformable.

Another embodiment of the present disclosure provides a display panel. The display panel includes the touch control module as described in the above embodiments arranged in an embedded form.

Another embodiment of the present disclosure provides a display device. The display device includes the display panel as described in the above embodiments.

Yet another embodiment of the present disclosure provides a method for performing touch control by using a touch control module. The touch control module includes a first substrate and an array of touch electrodes disposed on a first surface of the first substrate. The method includes: in a touch control period of a touch electrode row, applying the same touch scan signal to the touch electrode row and at least one touch electrode row directly adjacent to the touch electrode row simultaneously.

In certain exemplary embodiments, the method further includes: during a touch control period of a touch electrode row, a feedback signal of the at least one touch electrode row directly adjacent to the touch electrode row is not received.

In certain exemplary embodiments of the method, the touch control module operates in a self-capacitance touch mode.

In certain exemplary embodiments of the method, the touch control module further includes a common electrode disposed at a predetermined distance from the array of touch electrodes; and at least one of the first substrate and the common electrode is deformable. The method may further include determining a pressure applied on a touch electrode based on a distance between the touch electrode and the common electrode.

DETAILED DESCRIPTION OF THE DISCLOSURE

In the following, the technical solutions in embodiments of the disclosure will be described clearly and completely in connection with the drawings in the embodiments of the disclosure. Obviously, the described embodiments are only part of the embodiments of the disclosure, and not all of the embodiments. Based on the embodiments in the disclosure, all other embodiments obtained by those of ordinary skills in the art under the premise of not paying out creative work pertain to the protection scope of the disclosure.

Figure 1:
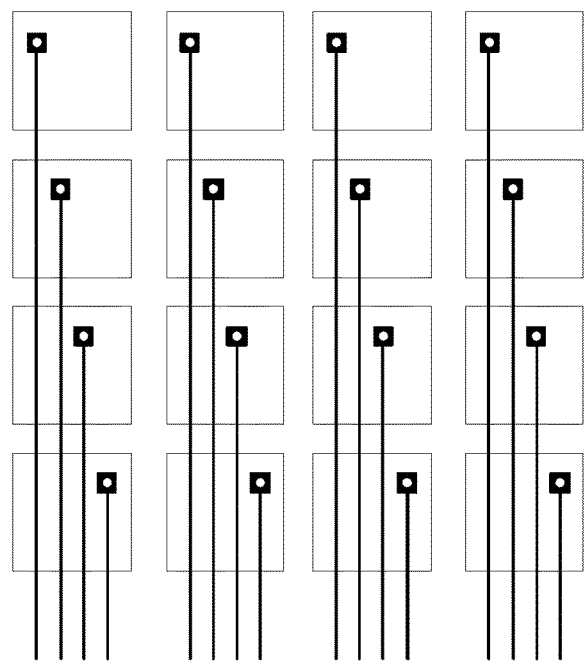
FIG. 1 is a schematic diagram of scanning signal wiring of a touch electrode in the related art.
Figure 2:
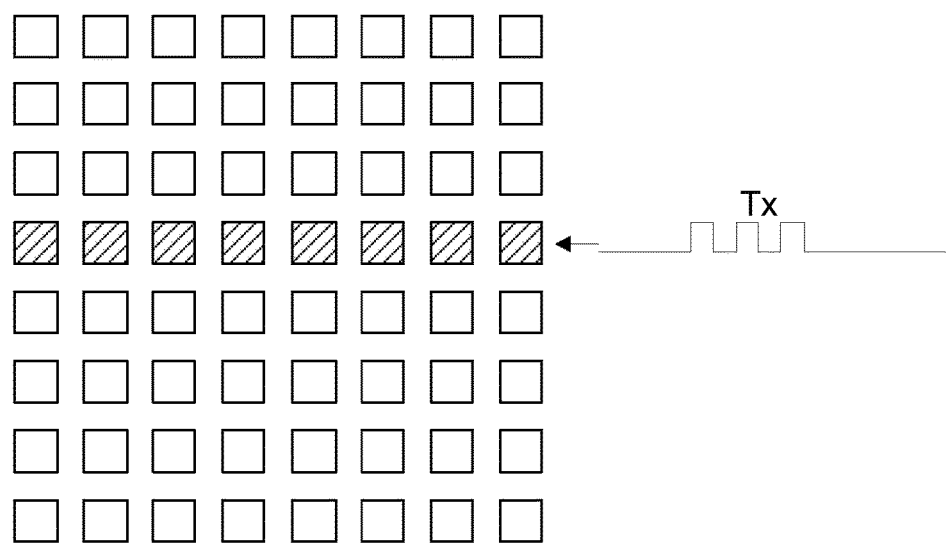
FIG. 2 is a schematic diagram of a scanning arrangement according to a touch electrode in the related art.
Figure 3:
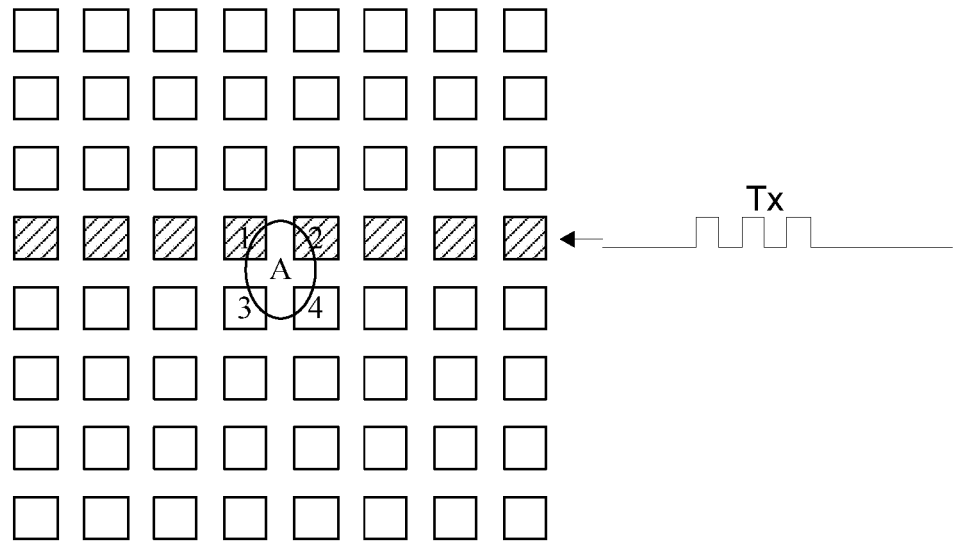
FIG. 3 shows the influence of the coupling between adjacent touch electrode rows in the related art.

FIG. 1 is a schematic diagram of scanning signal wiring of a touch electrode in a related art. FIG. 2 shows a schematic diagram of a scanning arrangement of the touch electrode in the related art. After the scanning signal Tx is sent to the touch electrode, the sensing signal Rx from the touch electrode is received to obtain the capacitance change information of the touch electrode. In touch displaying using the principle of self-capacitance, the conventional driving method is to scan a fixed number of rows at a time. In this way, an edge of a certain working row will be affected by adjacent rows during a touch period of this working row. The collected capacitance of this working row is thus relatively large. As shown in FIG. 3, for the touch electrodes 1 and 2 in the working row, due to the influence of the touch electrodes 3 and 4 in the adjacent row, the capacitance increment of the touch electrodes 1, 2, 3 and 4 near the touch point A may be the same, thereby reducing the expected capacitance increment of the touch electrodes 1 and 2. In this case, the touch electrodes 1 and 2 located in the working row may be detected as "not touched", affecting the touch accuracy.

Figure 4:
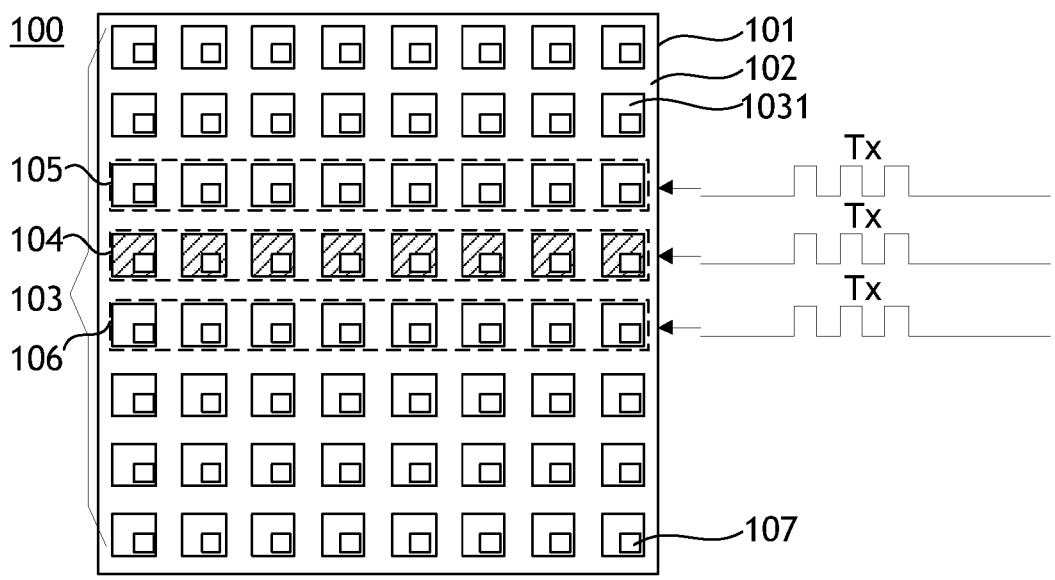
FIG. 4 is a schematic diagram of a scanning arrangement using a touch control module according to an embodiment of the present disclosure.

An embodiment of the present disclosure provides a touch control module. As shown in FIG. 4, the touch control module 100 includes a first substrate 101 and an array of touch electrodes 103 disposed on a first surface 102 of the first substrate 101. The array of touch electrodes 103 includes a plurality of touch electrodes 1031 arranged in an array. In a touch control period of a touch electrode row 104, the touch electrode row 104 and the touch electrode rows 105, 106 directly adjacent to the touch electrode row 104 are configured to receive a same touch scan signal Tx simultaneously.

In the embodiment of the present disclosure, in a touch control period of a touch electrode row, the same touch scan signal is simultaneously applied to the touch electrode row and at least one touch electrode row directly adjacent to the touch electrode row. Therefore, under the synchronous modulation, the influence of the coupling between the directly adjacent touch electrode rows is reduced and the overall uniformity of the capacitance is achieved, so that the accuracy of the touch positioning and the pressure touch control can be improved.

In some embodiments of the present disclosure, the array of touch electrodes can include, for example, a plurality of touch electrode rows and a plurality of touch electrode columns perpendicular to the plurality of touch electrode rows. In the context of the present disclosure, the "row" and the "column" are interchangeable concepts. Therefore, in some embodiments, in a touch period of a touch electrode column, the same touch scanning signal is simultaneously applied to the touch electrode column and at least one touch electrode column directly adjacent to the touch electrode column. Therefore, under the synchronous modulation, the influence of the coupling between the directly adjacent touch electrode columns is reduced and the overall uniformity of the capacitance is achieved, so that the accuracy of touch positioning and pressure touch control can be improved.

In certain exemplary embodiments, as shown in FIG. 4, the touch control module 100 further comprises a plurality of feedback signal switches 107 corresponding one-to-one to the touch electrodes in the array of touch electrodes. By the switching of the feedback signal switch, the feedback signal of the touch electrode in the array of touch electrodes can be selectively received. The feedback signal switch can be formed by a circuit switching element such as a thin film transistor, which is not limited herein. During a touch control period of the touch electrode row 104, only the feedback signal Rx of the touch electrode row 104 is received, and the feedback signal of the touch electrode rows 105, 106 directly adjacent to the touch electrode row 104 is not received.

In some embodiments, in order to accurately obtain the touch position and the touch area, the touch control module can further include a plurality of feedback signal switches corresponding one-to-one to the touch electrodes in the array of touch electrodes. During a touch control period of a touch electrode row/column, only the feedback signal of the touch electrode row/column is received, and the feedback signal of the at least one touch electrode row/column directly adjacent to the touch electrode row/column is not received. As a result, the accuracy of touch positioning is further increased.

Figure 5:
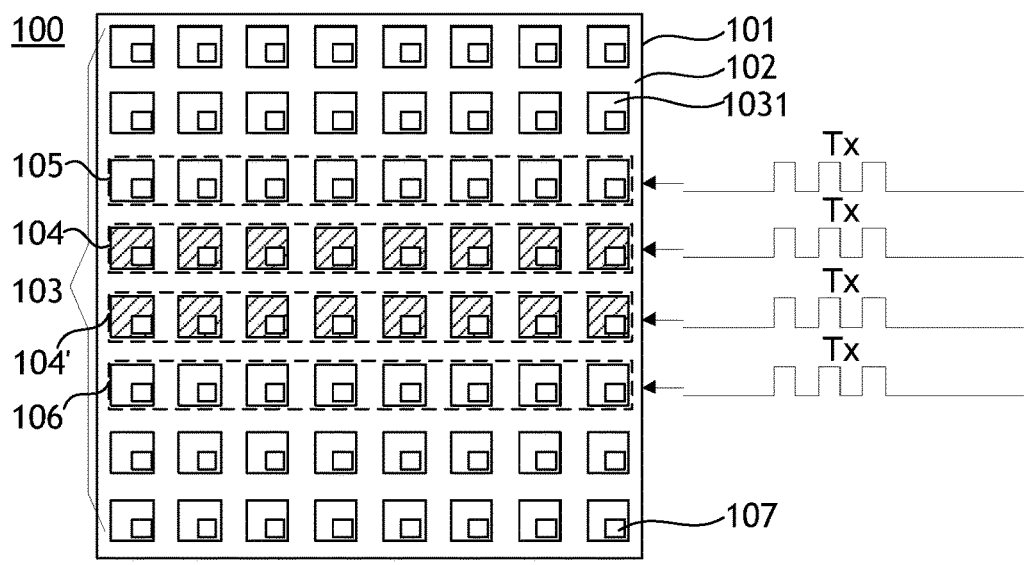
FIG. 5 is a schematic diagram of a scanning arrangement of a touch control module according to another embodiment of the present disclosure.

Although in the embodiment shown in FIG. 4, in the touch control period of the touch electrode row 104, the same touch scan signal Tx is simultaneously applied to the touch electrode row 104 and the touch electrode rows 105, 106 directly adjacent to the touch electrode row 104, those skilled in the art can understand that two or more touch electrode rows directly adjacent to the touch electrode row 104 can also be set to work simultaneously. As shown in FIG. 5, in a touch control period of the directly adjacent touch electrode rows 104 and 104', the same touch scan signal Tx is simultaneously applied to the touch electrode rows 104, 104' and the touch electrode rows 105, 106 directly adjacent to the touch electrode rows 104, 104'. Similarly, the same touch scan signal Tx can also be simultaneously applied to more adjacent of touch electrode rows, thereby reducing the coupling effect in a larger area.

In certain exemplary embodiments, the touch control module is used in a self-capacitance touch mode.

In the self-capacitance touch mode, it is necessary to sense the capacitance variation of the touch electrode relative to ground; moreover, the object (e.g. a finger) and the adjacent touch electrodes have a greater influence on the sensed capacitance variation. Therefore, the touch control module can be used in the self-capacitance touch mode, so as to reduce the influence of the adjacent touch electrodes on the capacitance variation.

Figure 6A:
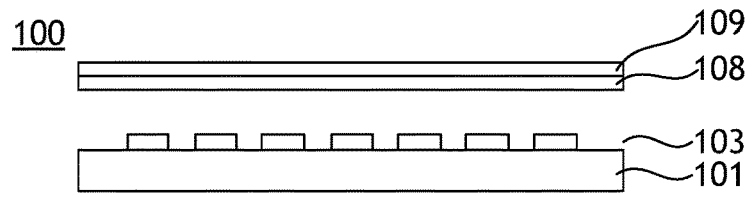
FIGS. 6a-6c are structural schematic diagrams of a touch control module for pressure touch control according to an embodiment of the present disclosure.
Figure 6B:
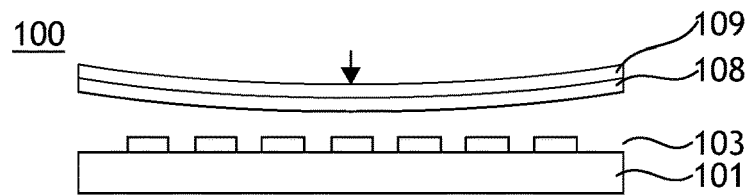
Figure 6C:
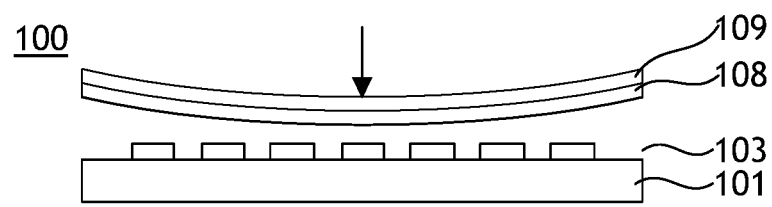

FIGS. 6a-6c are structural schematic diagrams of a touch control module for pressure touch control according to an embodiment of the present disclosure. In certain exemplary embodiments, as shown in FIGS. 6a-6c, the touch control module 100 further includes a common electrode 108 disposed at a predetermined distance from the array of touch electrodes 103; and at least one of the first substrate 101 and the common electrode 108 is deformable.

In FIGS. 6b and 6c, the common electrode 108 is pressed and deformed. Compared to FIG. 6b, the common electrode 108 is subjected to a larger pressure in FIG. 6c. For the self-capacitance touch mode, the self-capacitance increases as the pressure increases. The inventor has found that the accuracy of pressure touch control will also be greatly affected if the influence of the coupling between adjacent rows is not reduced. Referring to FIG. 3, for example, when the touch area is the area indicated by A, the touch electrode 1 may generate a smaller capacitance increment under the pressure shown in FIG. 6c, therefore, the pressure is determined as the status shown in FIG. 6b.

With the common electrode disposed at a predetermined distance from the array of touch electrodes, the capacitance of the touch electrode with respect to the common electrode can be changed according to the change of the distance between the touch electrode and the common electrode. Therefore, the pressure of the object (for example, a finger) on the touch control module can be determined by applying the change of the distance, so as to realize pressure touch control. However, during pressure touch control, the distance between the touch electrode and the common electrode and the coupling between the adjacent touch electrodes have a greater influence on the sensed capacitance variation. Therefore, the touch control module can be used for pressure touch control, so as to reduce the influence of the adjacent touch electrodes on the capacitance variation. In the context of the present disclosure, the term "common electrode" means an electrode connected to ground or a constant voltage. Those skilled in the art can understand that, as shown in FIGS. 6a-6c, the common electrode 108 can be disposed on a second substrate 109 opposite to the first substrate 101. The common electrode can also be an array of common electrodes. The second substrate 109 can also be deformable in order to achieve a change in the distance.

Figure 7:
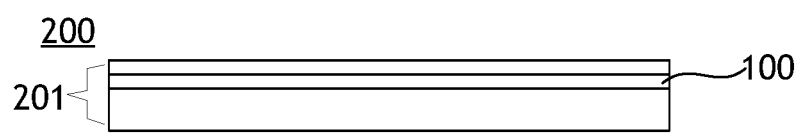
FIG. 7 is a schematic diagram of a display panel according to an embodiment of the present disclosure.

Another embodiment of the present disclosure provides a display panel. As shown in FIG. 7, the display panel 200 includes a display module 201 and the touch control module 100 as described in the above embodiments arranged in an embedded form.

In the In-Cell type display panel, the interval between the touch electrodes is relatively small. For example, for a liquid crystal display panel, the touch control module is disposed in the liquid crystal display panel in an embedded form, so as to form an In-Cell type liquid crystal display panel, which can advantageously reduce the influence of the coupling between the adjacent touch electrode rows (or the adjacent touch electrode columns) in the In-Cell type liquid crystal display panel. Similarly, the touch control module described in the embodiments of the present disclosure can also be disposed in an OLED (organic light emitting diode) display panel in an embedded form.

Another embodiment of the present disclosure provides a display device. The display device includes the display panel as described in the above embodiments. The display device can be any product or component with display function, such as mobile phone, tablet computer, TV, display, notebook computer, digital photo frame, navigator and so on. The implementation of the display device can refer to the embodiments of the above mentioned touch control module, which will not be repeated herein.

Another embodiment of the present disclosure provides a method for performing touch control by using a touch control module. As shown in FIG. 4, the touch control module 100 includes a first substrate 101 and an array of touch electrodes 103 disposed on a first surface 102 of the first substrate 101. The array of touch electrodes 103 includes a plurality of touch electrodes 1031 arranged in an array. The method includes: in a touch control period of a touch electrode row 104, applying the same touch scan signal Tx to the touch electrode row 104 and at least one touch electrode row (e.g., the touch electrode rows 105 and 106) directly adjacent to the touch electrode row 104 simultaneously.

In the embodiment of the present disclosure, in a touch control period of a touch electrode row, the touch electrode row and at least one touch electrode row directly adjacent to the touch electrode row are configured to receive a same touch scan signal simultaneously. Therefore, under the synchronous modulation, the influence of the coupling between the directly adjacent touch electrode rows is reduced and the overall uniformity of the capacitance is achieved, so that the accuracy of the touch positioning and the pressure touch control can be improved.

In some embodiments of the present disclosure, in a touch control period of a touch electrode column, the touch electrode column and at least one touch electrode column directly adjacent to the touch electrode column are configured to receive a same touch scan signal simultaneously. Therefore, under the synchronous modulation, the influence of the coupling between the directly adjacent touch electrode columns is reduced and the overall uniformity of the capacitance is achieved, so that the accuracy of the touch positioning and the pressure touch control can be improved.

In certain exemplary embodiments, as shown in FIG. 4, the method further includes: during a touch control period of a touch electrode row 104, only the feedback signal Rx of the touch electrode row 104 is received, and the feedback signal of the touch electrode rows 105, 106 directly adjacent to the touch electrode row 104 is not received.

In some embodiments, in order to accurately obtain the touch position and the touch area, the touch control module can further include a plurality of feedback signal switches corresponding one-to-one to the touch electrodes in the array of touch electrodes. During a touch control period of a touch electrode row/column, only the feedback signal of the touch electrode row/column is received, and the feedback signal of the at least one touch electrode row/column directly adjacent to the touch electrode row/column is not received. As a result, the accuracy of touch positioning is further increased.

Although in the embodiment shown in FIG. 4, in the touch control period of the touch electrode row 104, the same touch scan signal Tx is simultaneously applied to the touch electrode row 104 and the touch electrode rows 105, 106 directly adjacent to the touch electrode row 104, those skilled in the art can understand that two or more touch electrode rows directly adjacent to the touch electrode row 104 can also be set to work simultaneously. As shown in FIG. 5, in a touch control period of the directly adjacent touch electrode rows 104 and 104', the same touch scan signal Tx is simultaneously applied to the touch electrode rows 104, 104' and the touch electrode rows 105, 106 directly adjacent to the touch electrode rows 104, 104'. Similarly, the same touch scan signal Tx can also be simultaneously applied to more adjacent of touch electrode rows, thereby reducing the coupling effect in a larger area.

In certain exemplary embodiments, in the method, the touch control module operates in a self-capacitance touch mode.

In the self-capacitance touch mode, it is necessary to sense the capacitance variation of the touch electrode relative to ground; moreover, the object (e.g. a finger) and the adjacent touch electrodes have a greater influence on the sensed capacitance variation. Therefore, the touch control module can be used in the self-capacitance touch mode, so as to reduce the influence of the adjacent touch electrodes on the capacitance variation.

In certain exemplary embodiments, as shown in FIGS. 6a-6c, the touch control module 100 further includes a common electrode 108 disposed at a predetermined distance from the array of touch electrodes 103; and at least one of the first substrate 101 and the common electrode 108 is deformable. The method further includes determining a pressure applied on a touch electrode based on a distance between the touch electrode and the common electrode.

As shown in FIGS. 6a-6c, the common electrode 108 can be disposed on a second substrate 109 opposite to the first substrate 101; and the common electrode 108 can be an array of common electrodes. The second substrate 109 can also be deformable in order to achieve a change in the distance.

The embodiments of the present disclosure provide a touch control module, a display panel, a display device, and a touch control method. The touch control module includes a first substrate and an array of touch electrodes disposed on a first surface of the first substrate. In a touch control period of a touch electrode row, the touch electrode row and at least one touch electrode row directly adjacent to the touch electrode row are configured to receive a same touch scan signal simultaneously. Therefore, under the synchronous modulation, the influence of the coupling between the directly adjacent touch electrode rows is reduced and the overall uniformity of the capacitance is achieved, so that the accuracy of the touch positioning and the pressure touch control can be improved.

Apparently, the person skilled in the art may make various alterations and variations to the disclosure without departing the spirit and scope of the disclosure. As such, provided that these modifications and variations of the disclosure pertain to the scope of the claims of the disclosure and their equivalents, the disclosure is intended to embrace these alterations and variations.

The invention claimed is:

1. A touch control module, comprising:
   a first substrate, wherein the first substrate comprises a first surface,
   an array of touch electrodes disposed on the first surface of the first substrate, wherein the array of touch electrodes comprises a plurality of touch electrodes, and
   a plurality of feedback signal switches corresponding one-to-one to the touch electrodes in the array of touch electrodes,
   wherein, in a touch control period of a touch electrode row in the array of touch electrodes, the touch electrode row and at least one touch electrode row directly adjacent to the touch electrode row in the array of touch electrodes are configured to receive a same touch scan signal simultaneously, and a feedback signal of the at least one touch electrode row directly adjacent to the touch electrode row is not received.

2. The touch control module according to claim 1, wherein the touch control module is used in a self-capacitance touch mode.

3. The touch control module according to claim 2, further comprising a common electrode disposed at a predetermined distance from the array of touch electrodes; wherein at least one of the first substrate and the common electrode is deformable.

4. A display panel comprising the touch control module according to claim 1, wherein the touch electrodes are arranged in an embedded form, embedded inside the panel.

5. A display device comprising the display panel according to claim 4.

6. The display device according to claim 5, wherein the touch control module is used in a self-capacitance touch mode.

7. The display device according to claim 5, further comprising a common electrode disposed at a predetermined distance from the array of touch electrodes; wherein at least one of the first substrate and the common electrode is deformable.

8. The display panel according to claim 4, wherein the touch control module is used in a self-capacitance touch mode.

9. The display panel according to claim 4, further comprising a common electrode disposed at a predetermined distance from the array of touch electrodes; wherein at least one of the first substrate and the common electrode is deformable.

10. A method for performing touch control by using a touch control module; wherein the touch control module comprises a first substrate comprising a first surface, an array of touch electrodes comprising a plurality of touch electrodes, and a plurality of feedback signal switches corresponding one-to-one to the touch electrodes in the array of touch electrodes, wherein the array of touch electrodes is disposed on the first surface of the first substrate;
    wherein the method comprises: in a touch control period of a touch electrode row of the array of touch electrodes, applying a same touch scan signal to the touch electrode row and at least one touch electrode row directly adjacent to the touch electrode row simultaneously, and a feedback signal of the at least one touch electrode row directly adjacent to the touch electrode row is not received.

11. The method according to claim 10, wherein the touch control module operates in a self-capacitance touch mode.

12. The method according to claim 11, wherein the touch control module further comprises a common electrode disposed at a predetermined distance from the array of touch electrodes; and at least one of the first substrate and the common electrode is deformable; and
    wherein the method further comprises: determining a pressure applied on a touch electrode based on a distance between the touch electrode and the common electrode.

* * * * *